United States Patent

Mattheis et al.

[11] Patent Number: 6,085,337
[45] Date of Patent: Jul. 4, 2000

[54] METHOD AND SYSTEM FOR RELIABLY INDICATING TEST RESULTS DURING A SELF-CHECK OPERATION

[75] Inventors: Karl-Heinz Mattheis; Tommaso Bacigalupo, both of San Jose, Calif.

[73] Assignee: Infineon Technologies North America Corp., San Jose, Calif.

[21] Appl. No.: 09/157,752

[22] Filed: Sep. 21, 1998

[51] Int. Cl.[7] .................................................. G06F 11/27
[52] U.S. Cl. ................................ 714/30; 714/36; 714/40
[58] Field of Search .................................. 714/30, 36, 40, 714/41, 42, 43, 44, 45, 47, 703, 733, 734, 48

[56] References Cited

U.S. PATENT DOCUMENTS

| | | | |
|---|---|---|---|
| 4,726,024 | 2/1988 | Guziak et al. | 371/16 |
| 5,640,509 | 6/1997 | Balmer et al. | 395/183.18 |
| 5,704,038 | 12/1997 | Mueller et al. | 395/185.08 |
| 5,974,240 | 10/1999 | Chan | 395/394 |

*Primary Examiner*—Robert W. Beausoliel, Jr.
*Assistant Examiner*—Scott T. Baderman

[57] ABSTRACT

A method and system for accurately indicating test results from testing routines of a self-check operation during initialization or reset of the system utilize test result bits in a secure status register that must be sequentially reset to indicate a successful completion of the self-check operation. The system is a microcontroller that can be incorporated into various consumer products requiring digital processing. Each test result bit represents a distinct component of the system that is tested during the self-check operation. The test result bits in the status register can only be reset one at a time, by activating a demultiplexer which resets a particular test result bit in response to a successful testing of a component. However, the demultiplexer can only be activated by modifying a control bit in an access register that is protected by a double password scheme. To modify the control bit, the CPU must provide two valid passwords. The activation of the demultiplexer is repeated for each component of the system that is tested to reset a corresponding test result bit in the status register. Consequently, the CPU must write a different device designation value into the control register for each component that is tested. When all the test result bits have been reset, a confirmation signal is generated.

20 Claims, 6 Drawing Sheets

METHOD AND SYSTEM FOR RELIABLY INDICATING TEST RESULTS DURING A SELF-CHECK OPERATION

TECHNICAL FIELD

The invention relates generally to microcontrollers and more particularly to a method and system for indicating test results in a secure manner during a self-check operation.

DESCRIPTION OF THE RELATED ART

Microcontrollers can be found in a wide variety of consumer products, from household appliances to automobiles. Typically, a microcontroller includes a microprocessor and a number of peripheral devices, such as memory, a watchdog timer, and/or a universal asynchronous receiver transmitter (UART), on an integrated chip. The exact type and number of peripheral devices will depend on the product containing the microcontroller.

To ensure proper operation of the microcontroller, the watchdog timer monitors the microcontroller and generates an error signal when the watchdog timer detects a software or hardware failure. In addition, the components of the microcontroller are checked for malfunctions during initialization or reset of the microcontroller. Conventional procedures for checking components of microcontrollers are typically executed utilizing either exclusively software or exclusively hardware.

In an exclusive software procedure, a self-checking routine is performed to determine whether components of the microcontroller are in a condition to function properly. That is, the self-checking routine tests various components of the microcontroller to determine whether the components are able to operate in accordance with a prescribed protocol. If all the tested components pass the self-checking routine, the microcontroller is allowed to operate in a normal mode and the self-checking routine is terminated. However, if a malfunction of one or more components of the microcontroller is detected, the microcontroller is not allowed to operate in the normal mode until the malfunction is addressed and corrected. The detection of a malfunction will typically invoke operational isolation between the microcontroller and external devices. The interactions between the microcontroller and the external devices may be controlled by test result signals. For example, if the microcontroller is determined to be functioning properly, the test result signal may be a logical high, indicating a positive self-check result. Otherwise, the test result signal will be a logical low, indicating that the microcontroller is not able to function properly.

In an exclusive hardware procedure, test signals may be applied to various components of a microcontroller to generate test output signals in order to determine whether any of the components cannot function properly. The test output signals may be compared with control signals, such that when the test output signals are identical to the control signals, a positive test result signal is generated. For example, the positive test result signal may be a high signal. If the test output signals are not equivalent to the control signals, the test result signal will indicate that an error has been detected. A test result signal indicating an error may prevent interaction between the microcontroller and the external circuitry.

A concern with the exclusive software procedure is that a glitch in the self-checking routine, or the microprocessor performing the procedure, may result in an erroneous test result signal, erroneously indicating that the microcontroller has successfully passed the self-checking routine. A concern with the exclusive hardware procedure is that a failure of one or more of the components may erroneously produce the "equivalent" test output signals, which will be mistaken for a positive test result. In both procedures, the relative ease to erroneously indicate that the microcontroller is functioning properly creates a potential hazard in the operation of the malfunctioning microcontroller.

What is needed is a method and system having a high reliability with respect to indicating, during a self-checking procedure, that components of a microcontroller are able to function properly.

SUMMARY OF THE INVENTION

A method and system for accurately generating test results from testing routines of a self-check operation during initialization or reset of the system utilize test result bits in a secure status register that must be sequentially reset to indicate a successful completion of the self-check operation. The system is a microcontroller that can be incorporated into various consumer products requiring digital processing. The self-check operation ensures that the system is able to function properly by testing various components of the system.

Each test result bit in the status register is assigned to correspond to a distinct component of the system and is manipulated to indicate whether the corresponding system component has been tested and determined to be functioning properly. The test result bits can only be reset one at a time by activating a demultiplexer, which resets a particular test result bit in response to a successful testing of the corresponding component. The demultiplexer is configured to selectively reset a "next" test result bit, as identified by a device designation value input to the demultiplexer. The device designation value is written into a control register by a central processing unit (CPU) after a specific component of the system has been tested for a malfunction. The device designation values have a one-to-one correlation with both the system components and the test result bits. As an example, the device designation values may be 3-bit values. In this configuration, each device designation value is one of eight possible values. Each possible value may uniquely represent a component of the system that is to be checked during the self-check operation. Furthermore, in this configuration, the test result bits are eight bits which correlate to the eight possible device designation values and eight corresponding components of the system.

In the preferred embodiment, the status register is a read-only register in which bits stored in the status register can only be modified by hardware. The CPU is unable to write directly into the status register. Thus, the test result bits cannot be erroneously reset by the CPU writing into the status register. The read-only feature of the status register provides security for the test result bits.

As another safeguard, the test result bits are individually connected to a NOR gate that generates a confirmation signal indicative of proper system operation only when each of the test result bits has been reset to a state that indicates that the corresponding system component has been successfully tested. Moreover, the demultiplexer can only be activated by modifying a control bit in an access register that is protected by a double-password scheme. As an example, when the control bit has a value of "0", the demultiplexer is deactivated, but when the control bit is modified from "0" to "1", the demultiplexer is activated. In order to modify the control bit, the CPU must provide two valid passwords. That is, only after two passwords are entered into the access register by the CPU will the demultiplexer be activated. When activated, the demultiplexer senses the device designation value that was stored in the control register and resets a corresponding test result bit in the status register in response to the device designation value.

The system may be configured such that the first password must include values from the access register as well as values from the control register. By incorporating values from two registers, the first password may not be derived by simply reading the access register or the control register in isolation. In the preferred embodiment, the first password must also include an inverted value of a current value in the access register.

The activation of the demultiplexer is repeated for each component of the system that is tested to reset a corresponding test result bit in the status register. Consequently, the CPU must write a different device designation value into the control register for each component. When all the test result bits have been reset, the confirmation signal is generated by the NOR circuit.

DETAILED DESCRIPTION

Figure 1:
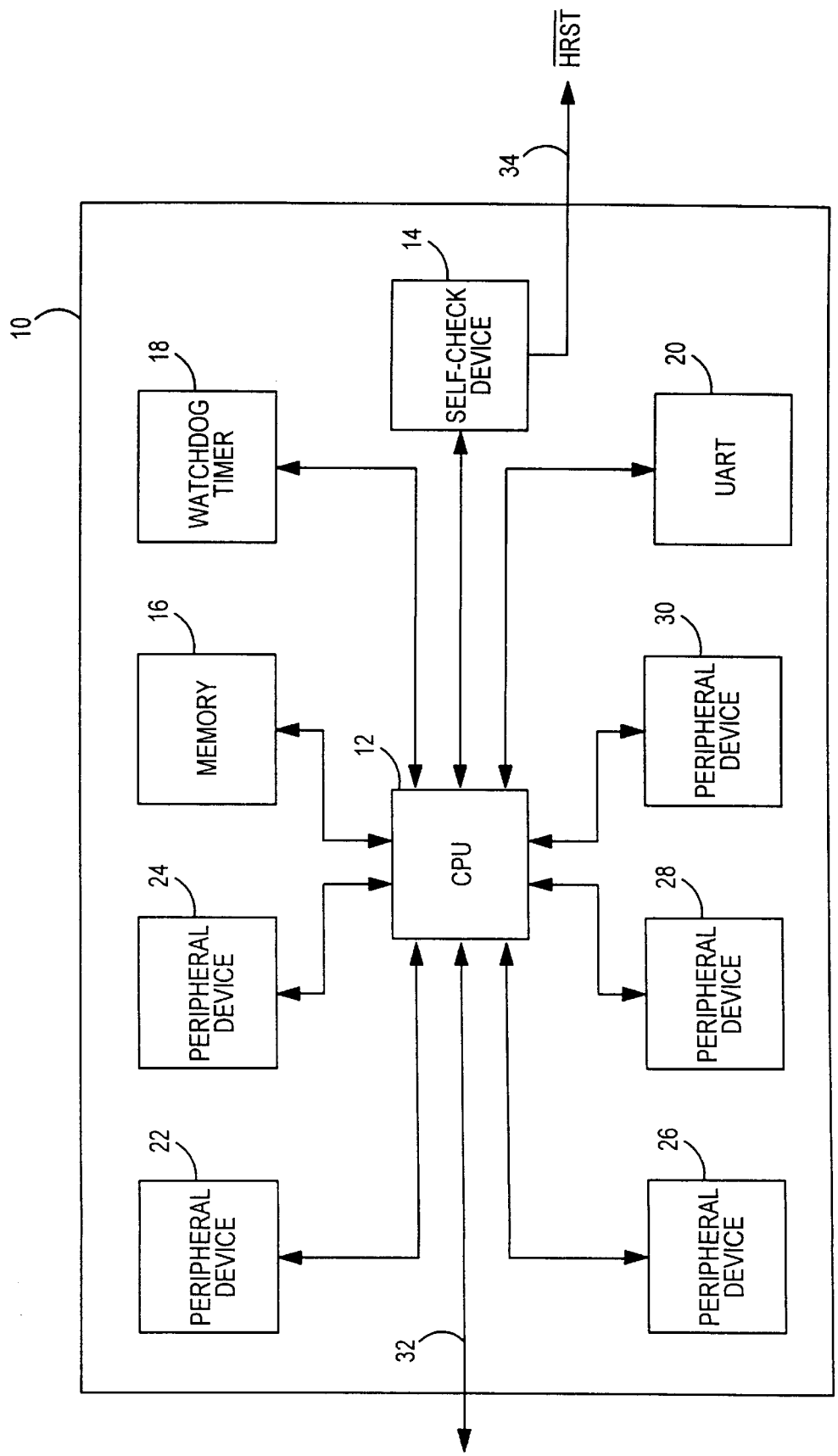
FIG. 1 is a block diagram of an integrated processing system in accordance with a first embodiment of the invention.

With reference to FIG. 1, an integrated processing system 10 is shown in accordance with a first embodiment of the invention. The integrated processing system 10 may be incorporated into a variety of machines that require signal processing, such as an automobile with a computerized emission control system. As shown in FIG. 1, the integrated processing system 10 includes a central processing unit (CPU) 12 that is coupled to a self-check device 14 and peripheral devices 16, 18, 20, 22, 24, 26, 28 and 30. The number of peripheral devices contained within the integrated processing system 10 is not critical to the invention. The integrated processing system 10 may have fewer or more peripheral devices than shown in FIG. 1.

Three of the peripheral devices are identified as memory 16, a watchdog timer 18, and a universal asynchronous receiver transmitter (UART) 20. The other peripheral devices 22, 24, 26, 28 and 30 are not specifically identified. The peripheral devices 22, 24, 26, 28 and 30 may be conventional devices typically found on an integrated chip along with a CPU. The specific operation of the peripheral devices 16–30 are not critical to the invention and are not described herein.

The CPU 12 is connected to external circuitry (not shown) by an electrical line 32. The electrical line 32 provides a means to exchange information between the integrated processing system 10 and the external circuitry. Another connection to the external circuitry from the integrated processing system 10 is provided by an electrical line 34. The electrical line 34 is coupled to the self-check device 14 of the integrated processing system 10. The self-check device 14 generates a hard reset ($\overline{HRST}$) signal to the external circuitry. The $\overline{HRST}$ signal is used to indicate that predetermined components of the integrated processing system 10 have been checked and are operating properly. For example, during a self-checking procedure, the $\overline{HRST}$ signal may be low in order to inform the external circuitry that the integrated processing system 10 has not been self-checked. Only after the self-check device 14 has determined that the integrated system 10 can function properly, the initial low $\overline{HRST}$ signal is driven by the self-check device 14 into a high signal, indicating that the integrated processing system 10 has successfully passed the self-checking procedure.

The self-checking procedure is performed by the self-check device 14 in conjunction with the CPU 12 and self-check software. The self-check software may be programmed into the memory 16. The self-checking procedure is initiated by a reset. The reset may be triggered by a boot sequence when the integrated processing system 10 is supplied with power. The reset may also be triggered by software or the watchdog timer 18. The integrated processing system 10 may be configured such that other situations can trigger the reset of the integrated processing system 10.

During the self-checking procedure, the predetermined components of the integrated processing system 10 are sequentially checked by the CPU. The predetermined components may include the memory 16, the watchdog timer 18, the UART 20 and the peripheral devices 22–30. After a particular component has been checked by the CPU and determined to be functioning properly, the result of the check is noted in a status register 40, shown in FIG. 2, within the self-check device 14. Only after each predetermined component of the integrated processing system 10 has been checked and determined to be functioning properly, the self-checking procedure is successfully terminated. If one of the predetermined components is determined to be malfunctioning, an error message is generated by either the CPU 12 or the self-check device 14. The error message may be utilized to reinitiate the self-checking procedure, or to indicate another appropriate response by the integrated processing system 10.

The self-check device 14 operates to ensure that the self-checking procedure is not mistakenly determined to have been successfully terminated. In particular, the self-check device 14 is designed to reduce the likelihood that an improper operation of the CPU 12 and/or other devices of the integrated processing system 10 during the self-checking procedure will not erroneously result in the high $\overline{HRST}$ signal, which indicates the successful completion of the self-checking procedure.

Figure 2:
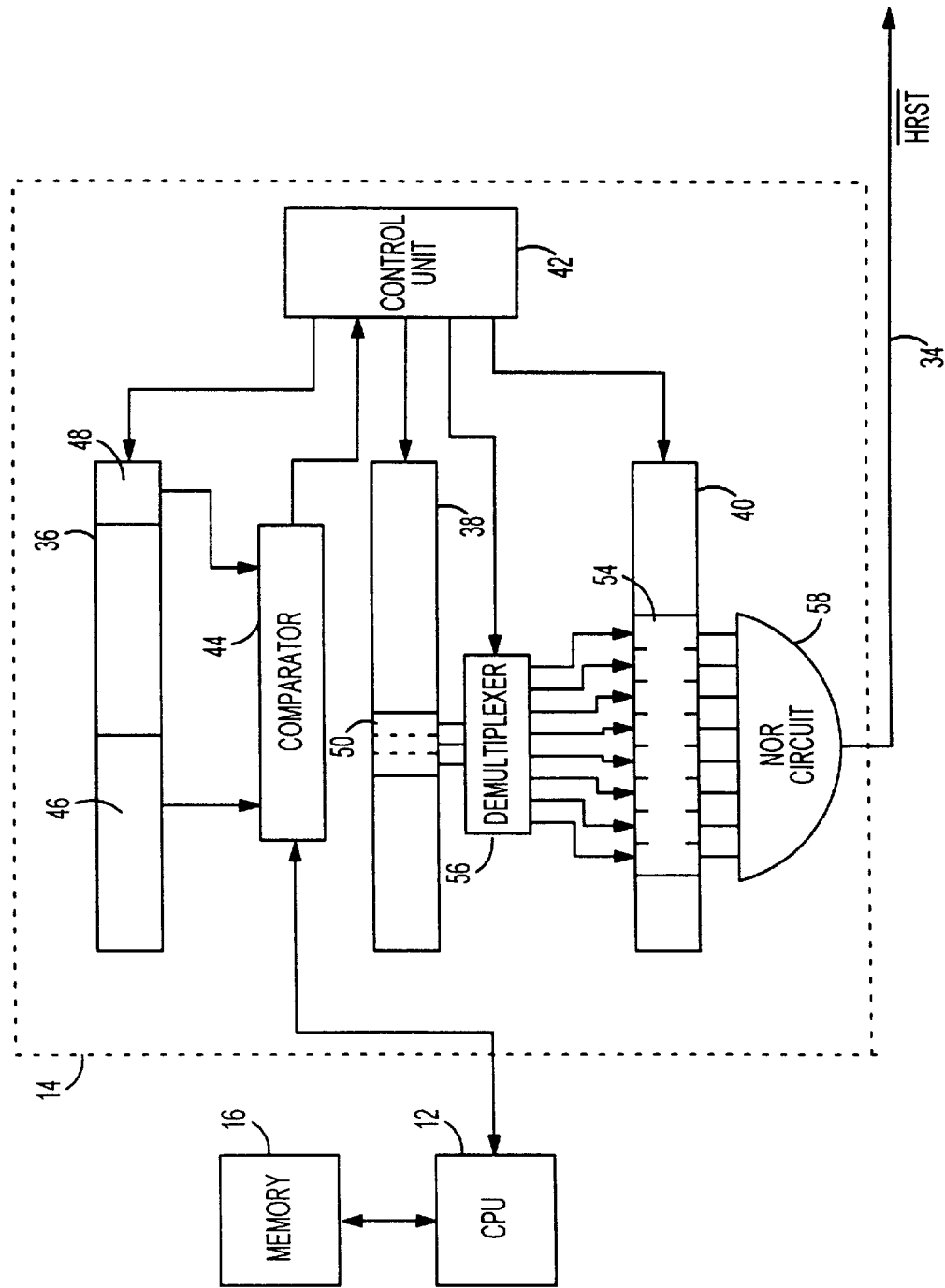
FIG. 2 is a detailed illustration of a self-check device of the integrated processing system of FIG. 1 in accordance with the invention.

Turning to FIG. 2, a detailed illustration of the self-check device 14 is shown. For simplification, only the CPU 12 and the memory 16 are illustrated along with the self-check device 14. The self-check device 14 includes an access register 36, a control register 38, and a status register 40 that are coupled to a control unit 42. The registers 36, 38 and 40 may be 32-bit registers. However, the sizes of the registers 36, 38 and 40 are not critical to the invention. The control unit 42 controls the reading from and writing into the registers 36, 38 and 40. In the preferred embodiment, the status register 40 is a read-only register and cannot be written into by the control unit 42. However, the data stored in the control unit 42 may be modified by hardware. The registers 36 and 38 are coupled to a comparator 44. The comparator 44 is also connected to the control unit 42 and the CPU 12. The comparator 44 provides the control unit 42 with information regarding access to the registers 36, 38 and 40.

The access register 36 includes a codeword bit field 46 and a control bit field 48. The codeword bit field 46 may contain an 8-bit codeword. However, the number of bits contained in the codeword is not essential to the invention. The codeword bits are user-definable and are utilized to access the register 36. The control bit field 48 contains a single control bit that controls access to the registers 36 and 38 for writing operations. The control bit is reset after a prescribed procedure to "0" by hardware.

The control register 38 includes a device designation bit field 50. The device designation bit field 50 contains a 3-bit device designation value that can represent each of the predetermined components to be checked during the self-checking procedure. In this embodiment, the 3-bit device designation value can represent up to eight predetermined components to be checked, since there are eight different possible combinations using three bits. However, by increasing the bit size of the device designation value, the self-check device 14 may be configured to accommodate more than eight predetermined components. For example, if the device designation value is a 4-bit value, the possible combinations can accommodate sixteen predetermined components.

The status register 40 includes a test result bit field 54. In this embodiment, the test result bit field 54 contains an 8-bit test result value. Initially, all the bits in the 8-bit test result value are set with a particular value, for example, a "1". As each of the predetermined components is checked and determined to be functioning properly, the initial value of "1" is converted into a "0". A particular value of the 3-bit device designation value within the control register 38 is associated with a corresponding bit of the 8-bit test result value. When all eight bits have been converted to "0"s, the self-checking procedure has been successfully completed. At this point, the $\overline{HRST}$ signal is driven high.

The association of the 3-bit device designation value with the 8-bit test result value is facilitated by a demultiplexer 56. The demultiplexer 56 is designed to receive a 3-bit value from the device designation bit field 50 of the control register 38 and to output a signal to one of eight output lines. However, the demultiplexer 56 is only activated when the control bit has a particular value, which correlates to the same value that locks the control register 38 and prevents writing into the register 38. Each of the eight output lines is connected to one of eight locations within the test result bit field 54 of the status register 40. A location within the test result bit field 54 contains a single bit of the 8-bit test result value.

The test result bit field 54 of the status register 40 is connected to a NOR circuit 58. The NOR circuit 58 is coupled to the electrical line 34 which carries the $\overline{HRST}$ signal. The NOR circuit 58 drives the $\overline{HRST}$ signal high only when all eight bits of the 8-bit test result value have been converted to "0"s.

In operation, each of the predetermined peripheral devices is checked sequentially by the CPU 12 using the self-check software. After each checking of a peripheral device, a bit in the test result bit field 54 in the status register 40 of the self-check device 14 is cleared. The clearing of a bit in the test result bit field 54 is intentionally made difficult in order to prevent erroneous clearing of bits in the test result bit field 54.

After the CPU 12 has performed a checking procedure on a particular peripheral device, for example, the memory 16, the CPU 12 must clear a corresponding bit in the test result bit field 54. Initially, the CPU 12 writes a 3-bit device designation value that corresponds to the device that was checked into the device designation bit field 50. For example, the 3-bit device designation value may be "000" for the memory 16, which activates the far left output line of the demultiplexer 56 when the demultiplexer 56 is provided with that value. Thus, the far left bit in the test result bit field 54 of the status register 40 represents the memory 16. The CPU 12 is able to write into the control register 38 because the control bit within the control bit field 48 of the access register 36 is automatically reset to a value of "0", which allows writing access to the control register 38.

In order to clear a bit in the test result bit field 54 that has a one-to-one relations with the 3-bit device designation value, the demultiplexer 56 must be activated. However, the demultiplexer 56 is only active when the control bit is set to "1". Since the control bit is initially set to "0", the control bit must be changed. To change the control bit from "0" to "1", the CPU 12 must correctly write two passwords into the comparator 44 in a two step procedure.

The first step will be referred to as an "access" step. During this step, the CPU 12 must write a first password into the comparator 44 that is identical to the contents of the access register 36, which includes the codeword value and the control bit of "0". The comparator 44 compares the contents of the access register 36 with the first password provided by the CPU 12. The second step will be referred to as a "modify-access" step. During this step, the CPU 12 must write a second password into the comparator 44. The second password must include the contents of the access register 36, excluding the codeword value and the control bit. If either password is incorrect, access to the register 36 is denied and an error signal may be generated by the control unit 42.

The codeword value in the bitfield 46 may be changed by the CPU 12 by incorporating a modified codeword value in the second password during the modify-access step. The modified codeword value will be stored in the codeword bit field 46 of the access register 36, such that during the next cycle of checking a different device, the CPU 12 must write another first password which will include the changed codeword value. The change of the control bit to "1" will activate the demultiplexer 56, which in turn will clear the corresponding bit in the test result bit field 54 of the status register 40. For example, the far left bit in the test result bit field 54 will be changed from "1" to "0", indicating that the memory 16 has been successfully checked. The control bit in the access register 36 is reset to "0" by the control unit 42. In the preferred embodiment, the CPU 12 must again perform the access and modify-access steps using two new passwords to reset the control bit. The self-check device 14 is now ready to repeat the above steps to clear the next bit in the test result bit field 54 of the status register 40. The above steps, including writing a 3-bit device designation value into the control register 38 and activating the demultiplexer 56, are repeated until all the bits in the test result bit field 54 have been cleared or until a malfunction is detected.

Figure 3:
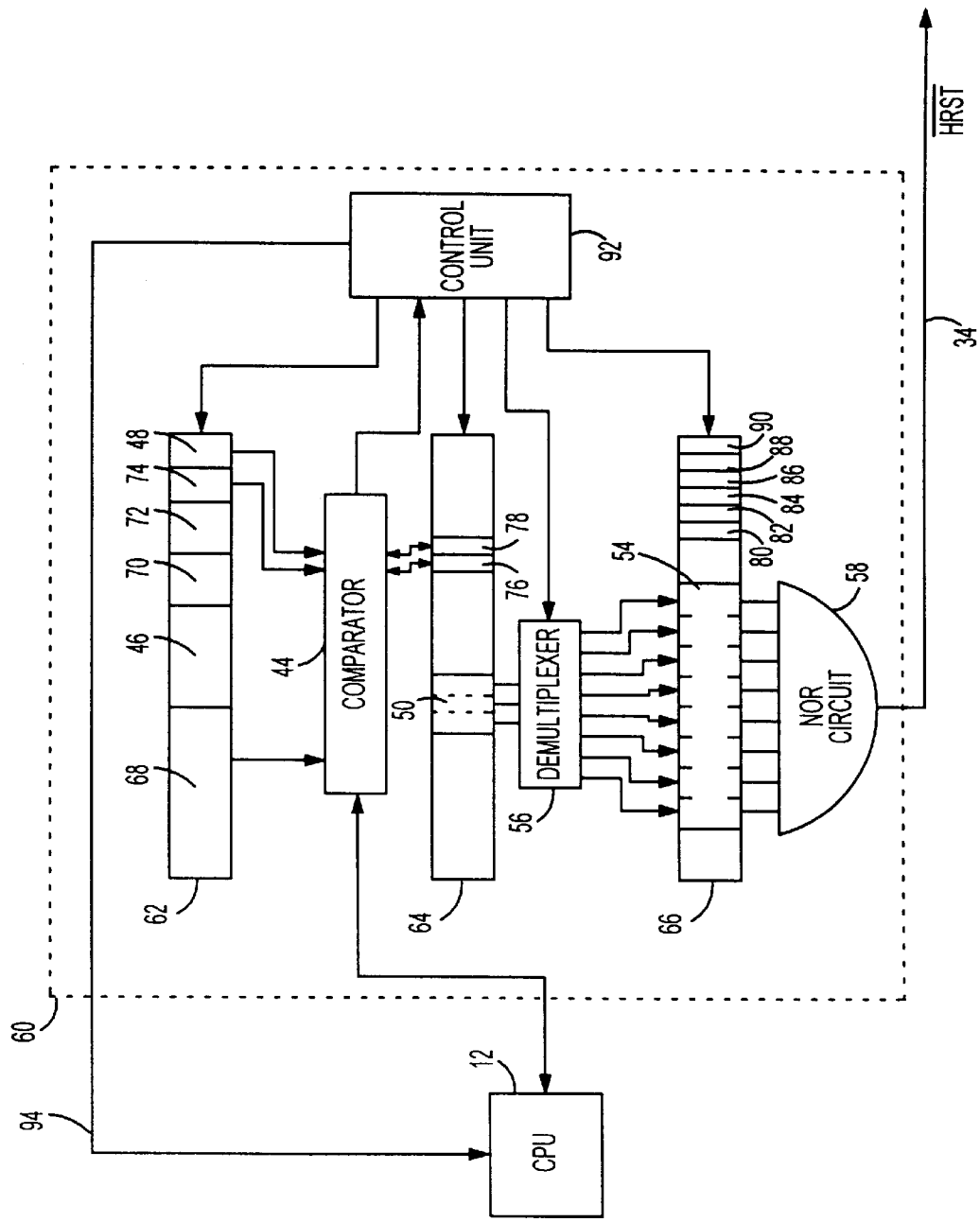
FIG. 3 is a detailed illustration of a watchdog timer incorporating features of the self-check device of FIG. 2 in accordance with a second embodiment of the invention.

In FIG. 3, a second embodiment of the invention is shown. In this embodiment, the components of the self-check device 14 of FIG. 2 have been incorporated into a watchdog timer 60. The same reference numeral will be used to identify the same components of FIG. 2. Since the function of the watchdog timer 60 is not critical to the invention, components that are exclusively utilized for the watchdog timer 60 are not illustrated in FIG. 3. The watchdog timer 60 is able to function similarly to conventional watchdog timers, allowing the integrated processing system 10 to recover from software or hardware failure during operation. The second embodiment of the invention includes features that provide additional security to the self-checking procedure.

The watchdog timer 60 includes a watchdog access register 62, a watchdog control register 64, and a watchdog status register 66. The watchdog access register 62 includes the codeword bit field 46 and the control bit field 48. The register 62 also includes a reload bit field 68, a 4-bit dummy bit field 70, a 2-bit dummy bit field 72, and a lock bit field 74. The reload bit field 68 contains a 16-bit reload value that is utilized for the watchdog function of the watchdog time 60. The dummy bit field 70 is configured such that only "0000" is read if accessed. The contents of the dummy bit fields 70 and 72 are not relevant to the invention. The lock bit field 74 contains a single bit lock value. The lock value is modified by hardware after each successful access step or modify-access step. The lock value is set to "0" after a successful access step, indicating that the watchdog access register 62 is unlocked. After a successful modify-access step, the lock value is modified to "1", indicating that the register 62 is locked. Similar to the access register 46 of the self-check device 14 in FIG. 2, a two step procedure is required to access the watchdog access register 62 in order to modify any values within the register 62. Again, the terms "access" and "modify-access" steps will be utilized in reference to the two step procedure.

The watchdog control register 64 includes the device designation bit field 50, an enable/disable bit field 76, and a frequency bit field 78. The enable/disable bit field 76 contains a single enable/disable value. An enable/disable value of "0" is a request to enable the watchdog timer 60, while an enable/disable value of "1" is a request to disable the watchdog timer 60. This request is forwarded to a control unit 92 when the control bit is set to "1". The enable/disable value is held at the register 64 when the control bit is set to "0". The frequency bit field 78 contains a single frequency value. A frequency value of "0" is a request to set input frequency to a system clock (not shown) at a first predetermined value X, such as 16384. On the other hand, a frequency value of "1" is a request to set input frequency to the system clock at a second predetermined value Y, such as 256.

The watchdog status register 66 includes the test result bit field 54 and a number of bit fields 80, 82, 84, 86, 88 and 90. The bit fields 80–90 contain bits that are exclusively related to the watchdog timer function of the watchdog timer 60. For example, the bit field 84 may contain a bit controlling whether the watchdog function of the watchdog timer 60 is enabled or disabled.

The registers 62, 64 and 66 are each connected to the control unit 92. The control unit 92 controls reading from and writing into the registers 62, 64 and 66. In addition, the control unit 92 generates a reset signal to the CPU 12 via electrical line 94 when it determines that a software or hardware failure has occurred. The control unit 92 is also connected to the comparator 44 and the demultiplexer 56. The demultiplexer 56 is coupled to the test result bit field 54, which in turn is coupled to the NOR circuit 58.

The self-checking procedure utilizing the watchdog timer 60 is essentially identical to the self-checking procedure of the self-check device 14 of FIG. 2. Initially, a peripheral device is checked by the CPU 12. The CPU 12 then writes a device designation value that corresponds to the checked device into the device designation bit field 50. The CPU 12 then performs access and modify-access steps to change the control bit in the control bit field 48 of the watchdog access register 62 from "0" to "1" to activate the demultiplexer 56 in order to clear a bit in the test result bit field 54 of the watchdog status register 66. In the preferred embodiment, the CPU must again perform another access and modify-access steps to reset the control bit back to "0". Once the bit is cleared, the steps are repeated with respect to another peripheral device that is to be checked until all of the predetermined peripheral devices have been checked, which would correspond to all of the bits in the test result bit field 54 being cleared. When all the bits in the test result bit field 54 have been cleared, the NOR circuit 58 drives the $\overline{\text{HRST}}$ signal high, informing the external circuitry that the integrated processing system 10 is ready to operate in a normal mode.

Figure 4:
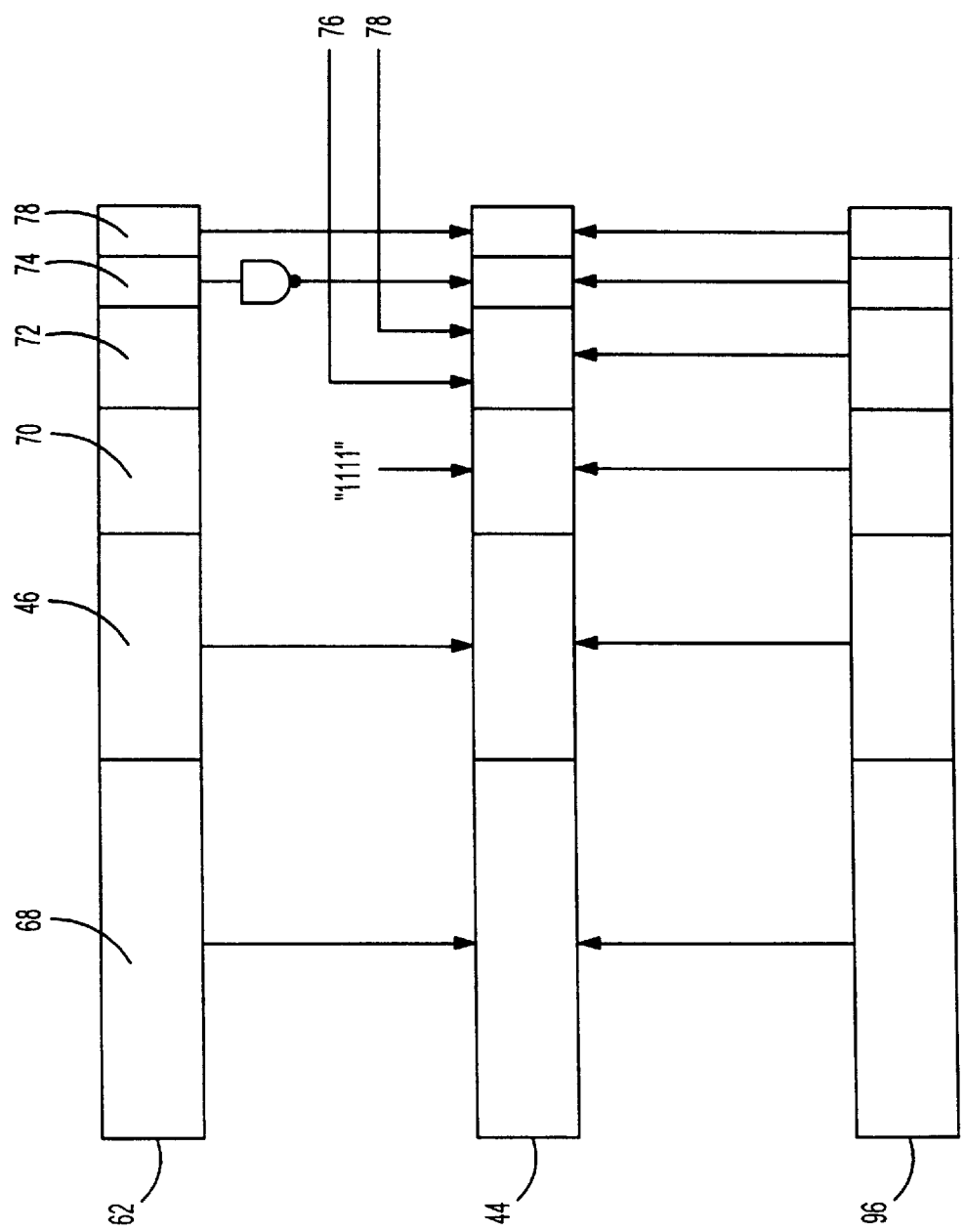
FIG. 4 is an illustration of an access register of the watchdog timer of FIG. 3 and a first password that is required during an access step in accordance with the present invention.

The difference between the self-checking procedures of the self-check device 14 and the watchdog timer 60 is the passwords that are required during the access step and the modify-access step in order to change the control bit in the watchdog access register 62 from "0" to "1". FIG. 4 illustrates the first password that must be provided by the CPU 12 in order to successfully complete the access step. A shadow register 96 represents the first password provided by the CPU 12. The first password must be identical to the values that are being used to compare the first password in order to pass the access step. The comparator 44 receives the reload and codeword values from the reload bit field 68 and the codeword bit field 46, respectively. Therefore, the first password must include the reload and codeword values. With respect to the value corresponding to the dummy bit field 70, the first password must include "1111" because the comparator 44 uses these bits to compare the first password. The reason why the bits from the dummy bit field 70 are not used is to prevent the first password from being ascertained by simply reading the contents of the watchdog access register 62. The dummy bit field 70, when read, always provides "0000", which would yield the wrong first password.

As an added security, the bits from the dummy bit field 72 are not utilized in the first password. Instead, the bits from the enable/disable bit field 76 and the frequency bit field 78 are used. Therefore, the first password must include these two bits that are in the watchdog control register 64. In addition, the inverted value from the lock bit field 74 is used in the first password. Lastly, the first password includes the value of the control bit in the control bit field 48. If the CPU 12 provides the correct first password, the access step is successfully terminated.

Figure 5:
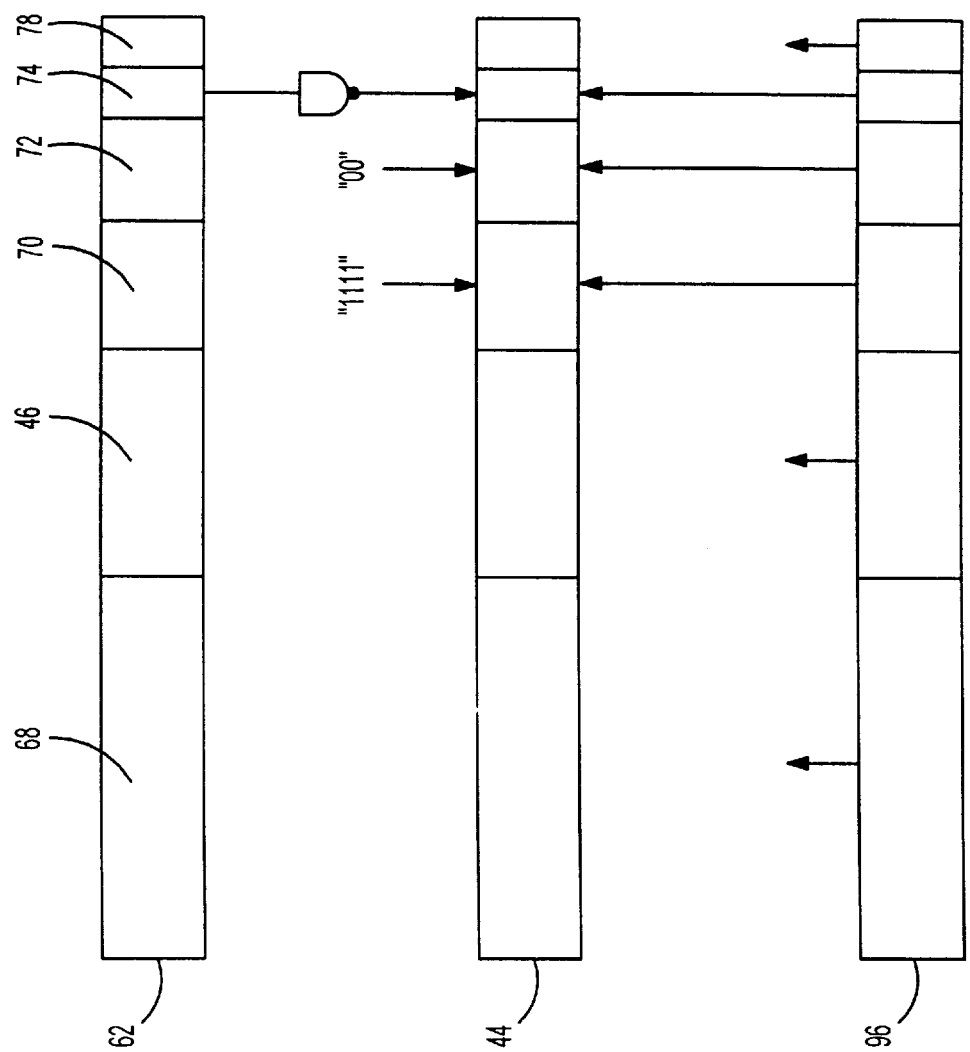
FIG. 5 is an illustration of a second password that is required to access the access register of the watchdog timer of FIG. 3 during a modify-access step in accordance with the present invention.

Following the access step, the modify-access step must be completed in order to change the control bit value from "0" to "1". The CPU 12 must provide a second password that is used to unlock the watchdog access register 62 and to write into the desired writeable bit fields within the register 62. FIG. 5 illustrates the second password that must be provided by the CPU 12 in order to successfully complete the modify-access step. The same reference numerals of FIG. 4 will be used in FIG. 5. The second password is compared by the comparator 44 with respect to only a small portion of the second password. The values of the second password that correspond to the bit fields 70, 72, and 74 are utilized by the comparator 44 in order to verify the second password. With respect to dummy bit field 70, the comparator 44 compares a corresponding value within the second password with a value of "1111". Therefore, the second password must include this value. With respect to dummy bit field 72, the comparator 44 compares a corresponding value within the second password with a value of "00". In contrast, the comparator 44 compares the corresponding value within the first password with the current values from the bit fields 76 and 78 during the access step. Lastly, the comparator 44 compares an inverted value from the lock bit field 74 with a corresponding value within the second password. However, the lock value of bit field 74 has been modified from "1" to "0" by hardware to indicate that the watchdog access register is unlocked. Therefore, the inverted value from the lock bit field 74 is different for the first and second passwords. As long as the second password contains the above values, the watchdog access register 62 is accessible for modifying values within the bit fields 68, 46 and 48.

The second password should include a value of "1" with respect to the control bit field 48 in order to change the control bit stored in the control bit field 48 from "0" to "1". As to the values within the second password corresponding to the bit fields 46 and 68, these values could contain values to modify the values within the bit fields 46 and 68. Alternatively, these values could be the same values that were present in the bit fields 46 and 68 prior to the access step. However, if the values in the bit fields 46 and 68 are modified, these values must be included in the next first password during the next access step in order to access the watchdog access register 62 to modify the control bit.

Alternative configurations of the comparator 44 are contemplated for setting the first and second passwords. For example, the comparator 44 may receive the current value within the device designation bit field 50 of the watchdog control register 64 when comparing first and second passwords. In this configuration, the first and second passwords then must contain that value in order to successfully complete the access and modify-access steps. Since the device designation value changes for different peripheral devices that are checked, the passwords that need to be provided by the CPU 12 are more complex, reducing the likelihood of an unauthorized access to the watchdog access register 62. Likewise, the comparator 44 may be configured such that the first password must include the current value in the test result bit field 54.

Figure 6:
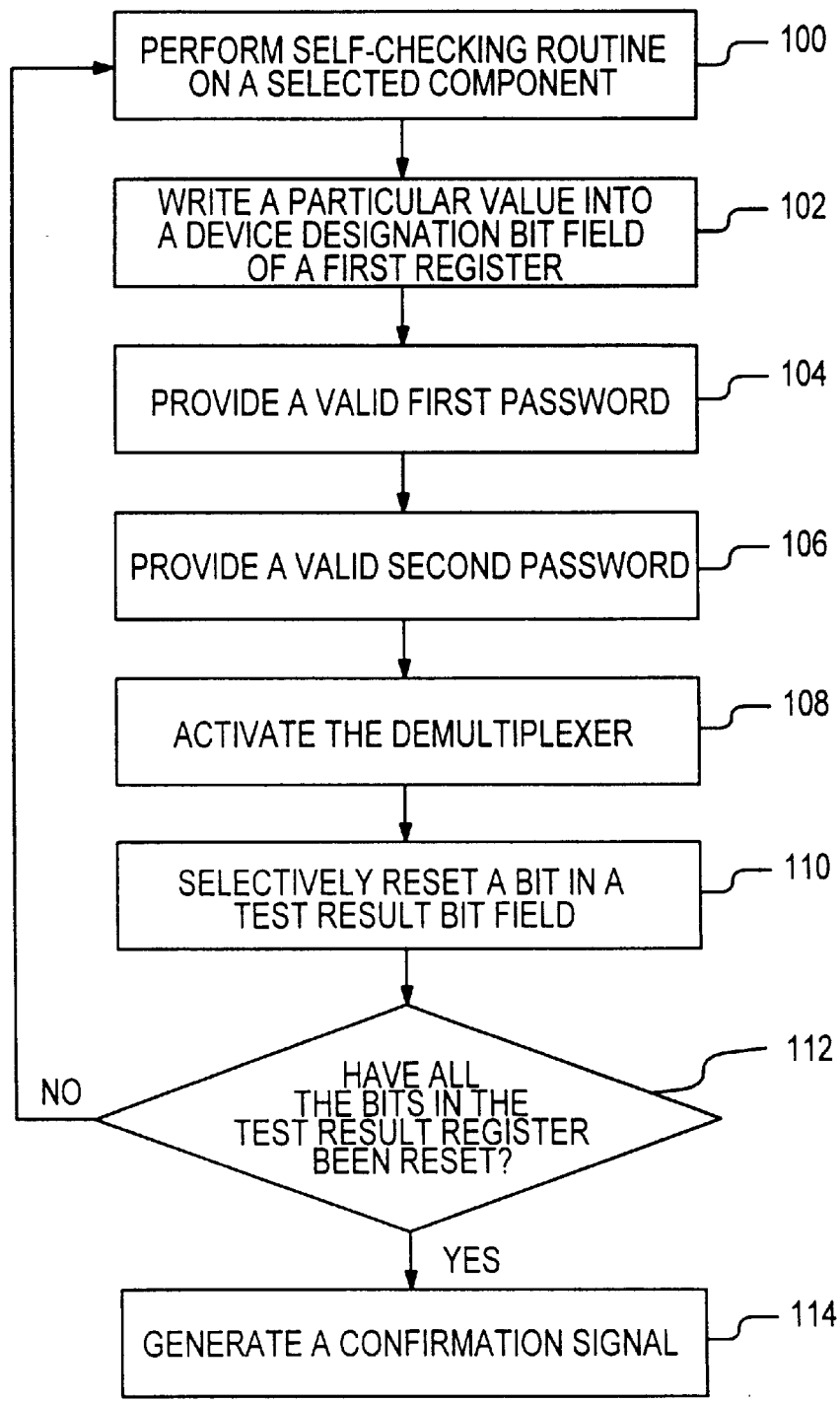
FIG. 6 is a flow diagram of a method for reliably indicating positive test results during a self-checking procedure in accordance with the invention.

A method for reliably indicating positive test results during a self-checking procedure in accordance with the present invention will be described with reference to FIG. 6. At step 100, a self-checking routine is performed on a selected component of an integrated processing system. The self-checking routine is performed by a central processing unit (CPU) of the system utilizing self-check software. If the CPU determines that the component is malfunctioning, the CPU may generate an error signal to indicate the malfunction. In the preferred embodiment, the CPU has reset the control bit to "0" by performing access and modify-access steps using two valid passwords. In step 102, a value that correlates to the checked component is written into a device designation bit field of a first register by the CPU. In one embodiment, the value is a 3-bit value having eight possible combinations that may correspond to eight components of the system to be checked. The device designation bit field of the first register is connected to a test result bit field in a second register via a demultiplexer. The demultiplexer, when activated, resets a bit in the test result bit field in response to the value stored in the device designation bit field. However, the demultiplexer is controlled by a control bit stored in a third register. To activate the demultiplexer, the control bit must be modified from a default value to a new value, for example, from "0" to "1".

In order to modify the control bit, the CPU provides a first password and a second password at steps 104 and 106, respectively. During the step 106, the control bit is modified by a bit in the second password. After the control bit has been modified, the demultiplexer is activated at step 108. Next, at step 110, a bit in the test result bit field is reset by the demultiplexer. The bit that is being reset corresponds to the checked component of the system. At step 112, a determination is made whether all the bits in the test result bit field have been reset. If a positive determination is made at step 112, a confirmation signal is generated at step 114 to indicate that the self-check operation has been successfully completed. However, if a negative determination is made at step 112, steps 100–112 are repeated with respect to a different component of the system until all the components of the system have been successfully checked.

What is claimed is:

1. A method for generating test results during a self-check operation on predetermined components of a processing system comprising steps of:

performing a self-checking routine on a selected component of said processing system to determine whether said selected component is able to function in accordance with a prescribed protocol, said selected component being one of said predetermined components;

writing a particular value into a device designation bit field of a first register in response to a positive determination of said selected component with respect to said self-checking routine, said particular value being associated with said selected component;

selectively resetting a first bit in an N bit field within a second register in response to said device designation bit field within said first register, where N is greater than one, said first bit being uniquely associated with said selected component; and generating a confirmation signal to indicate that each of said predetermined components has successfully passed a self-checking routine selected for said each predetermined component, said confirmation signal being generated only when all of said bits in said N bit field have been reset, said bits in said N bit field being uniquely associated with said predetermined components.

2. The method of claim 1 further comprising a step of employing a selection mechanism connected to said device designation bit field of said first register and to said N bit field of said second register to select said first bit that is to be reset in response to said particular value written in said device designation bit field, including configuring said selection mechanism to select a particular bit within said N bit field as a response to reading said device designation bit field.

3. The method of claim 2 further comprising a step of activating said selection mechanism when a prescribed criterion has been satisfied such that said first bit is reset only when said selection mechanism is activated.

4. The method of claim 1 further comprising a step of requiring satisfaction of a prescribed criterion prior to proceeding to said step of selectively resetting said first bit in said N bit field, wherein said prescribed criterion involves accessing a third register and modifying a control bit within said third register.

5. The method of claim 4 wherein said step that includes satisfying said prescribed criterion further includes providing a first password in order to access said third register, said first password being compared to a first preselected value to determine whether access is granted.

6. The method of claim 5 further comprising a step of establishing said first preselected value by incorporating current data stored in said second register to form said first preselected value.

7. The method of claim 5 wherein said step that includes satisfying said prescribed criterion further includes providing a second password in order to modify said control bit within said third register, a portion of said second password being compared to a second preselected value to determine whether said control bit is allowed to be modified.

8. The method of claim 1 further comprising a step of repeating said steps of performing, writing and selectively resetting with respect to a next component to be self-checked, said next component being one of said predetermined components.

9. The method of claim 1 wherein said step of generating said confirmation signal includes employing a logic circuit to produce said confirmation signal when all said bits in said N bit field have been reset.

10. A method of signaling a successful termination of a self-checking procedure on a plurality of predetermined components of a processing system comprising steps of:
   (a) testing a selected component to determine whether said selected component has malfunctioned, said selected component being one of said predetermined components;
   (b) in response to a negative determination in step (a) with respect to a malfunction of said selected component, modifying a stored control bit in order to record a positive check of said selected component;
   (c) resetting a selected bit in a storage N bit field in response to said control bit being modified, said selected bit uniquely representing said positive check of said selected component;
   (d) repeating steps (a), (b), and (c) for each of N predetermined components; and
   (e) generating a signal when all bits in said N bit field have been reset, said signal indicating that each of said predetermined components have been successfully tested.

11. The method of claim 10 further comprising a step of monitoring said bits in said N bit field to determine when each of said bits has been reset.

12. The method of claim 10 wherein said step (b) of modifying said control bit includes providing a first password in order to access a first register in which said control bit is stored, said first password being compared to a first preselected value to determine whether said first password is valid.

13. The method of claim 12 further comprising a step of establishing said first preselected value by incorporating portions of current data stored in said first register.

14. The method of claim 12 wherein said step that includes accessing said first register further includes requiring a second password to access said first register, said second password being different than said first password.

15. The method of claim 10 further comprising a step of identifying said selected bit in said N bit field in response to said step of testing said selected component, said step of identifying said selected bit being performed by a demultiplexer.

16. The method of claim 15 further comprising a step of inputting a particular value into said demultiplexer to reset a said selected bit in said N bit field, said particular value having a correlation with said selected bit and said selected component.

17. A processing system with self-checking capability comprising:
   processing means for sequentially testing a plurality of peripheral devices to confirm proper operation of each of said peripheral devices;
   first register means, operatively connected to said processing means and having a first bit field, for storing device designation data in a sequential manner that corresponds to said sequential testing of said peripheral devices, such that there is a correspondence between said peripheral devices and said device designation data;
   second register means, functionally coupled to said first register means and having N bits in a second bit field, for sequentially resetting a bit in said second bit field in response to each confirmation of proper operation of one of said peripheral devices, said sequential resetting being responsive to said sequential manner of storing said device designation data in said first bit field, each of said N bits being uniquely associated with one of said peripheral devices; and
   signaling means, responsive to said N bits of said second register means, for generating a confirmation signal upon detection that each of said N bits has been reset.

18. The system of claim 17 further comprising a demultiplexer connected between said first bit field of said first register means and said second bit field of said second register means, said demultiplexer being selectively activated to reset one of said N bits in response to said device designation data.

19. The system of claim 18 further comprising a third register interconnected to said processing means and said demultiplexer for storing a control bit to activate said demultiplexer.

20. The system of claim 17 wherein said signaling means includes a logic circuit connected to said second register means, said logic circuit configured to sense said N bits in said second register means to generate said confirmation signal when each of said N bits has been reset.

* * * * *